United States Patent [19]

Leppard et al.

[11] 4,183,734

[45] Jan. 15, 1980

[54] ADSORPTION HEAT PUMP

[75] Inventors: Colin J. Leppard, Emsworth; Robert S. E. Leslie, Havant, both of England

[73] Assignee: CJB Developments Limited, London, England

[21] Appl. No.: 910,771

[22] Filed: May 30, 1978

[30] Foreign Application Priority Data

Jun. 1, 1977 [GB] United Kingdom ............... 23246/77

[51] Int. Cl.² ............................................. B01D 53/04
[52] U.S. Cl. .......................................... 55/28; 55/33; 55/70; 55/73; 55/75
[58] Field of Search ................... 55/28, 33, 58, 70, 73, 55/74, 75; 62/324 D, 324 R, 480, 490; 165/DIG. 17

[56] References Cited

U.S. PATENT DOCUMENTS

| 1,729,081 | 9/1929 | Miller ................................. 62/480 X |
| 1,994,515 | 3/1935 | Hausen et al. ................. 62/324 R X |
| 2,024,083 | 12/1935 | Young ................................. 62/480 X |
| 2,438,105 | 3/1948 | Kleen ................................. 62/480 X |
| 3,007,543 | 11/1961 | Maher ............................. 62/324 C X |
| 3,504,494 | 4/1970 | Winsche ............................ 60/649 X |
| 3,844,737 | 10/1974 | Macriss et al. ...................... 55/75 X |
| 3,850,592 | 11/1974 | Huffman .................................. 55/33 |
| 3,866,428 | 2/1975 | Simonet et al. ..................... 55/75 X |
| 3,893,827 | 7/1975 | Leppard .................................. 55/25 |
| 4,030,896 | 6/1977 | Wimber et al. ......................... 55/33 |
| 4,044,819 | 8/1977 | Cottingham ................. 165/DIG. 17 |

Primary Examiner—Robert H. Spitzer
Attorney, Agent, or Firm—Bacon & Thomas

[57] ABSTRACT

A method of transferring heat from a low temperature reservoir to a high temperature reservoir in which a two bed adsorption system is used. An adsorbable component is desorbed from a first bed of a reversible adsorbent previously saturated with the adsorbable component and the heat required is transferred to the bed from a low temperature reservoir in heat-exchange relationship with the bed of adsorbent. The adsorbable component is then adsorbed on a second bed of a reversible adsorbent and the heat released is transferred to a high temperature reservoir in heat-exchange relationship with the bed. In order for the system to operate continuously the mode of operation of the first and second bed of reversible adsorbent must be periodically reversed.

10 Claims, 2 Drawing Figures

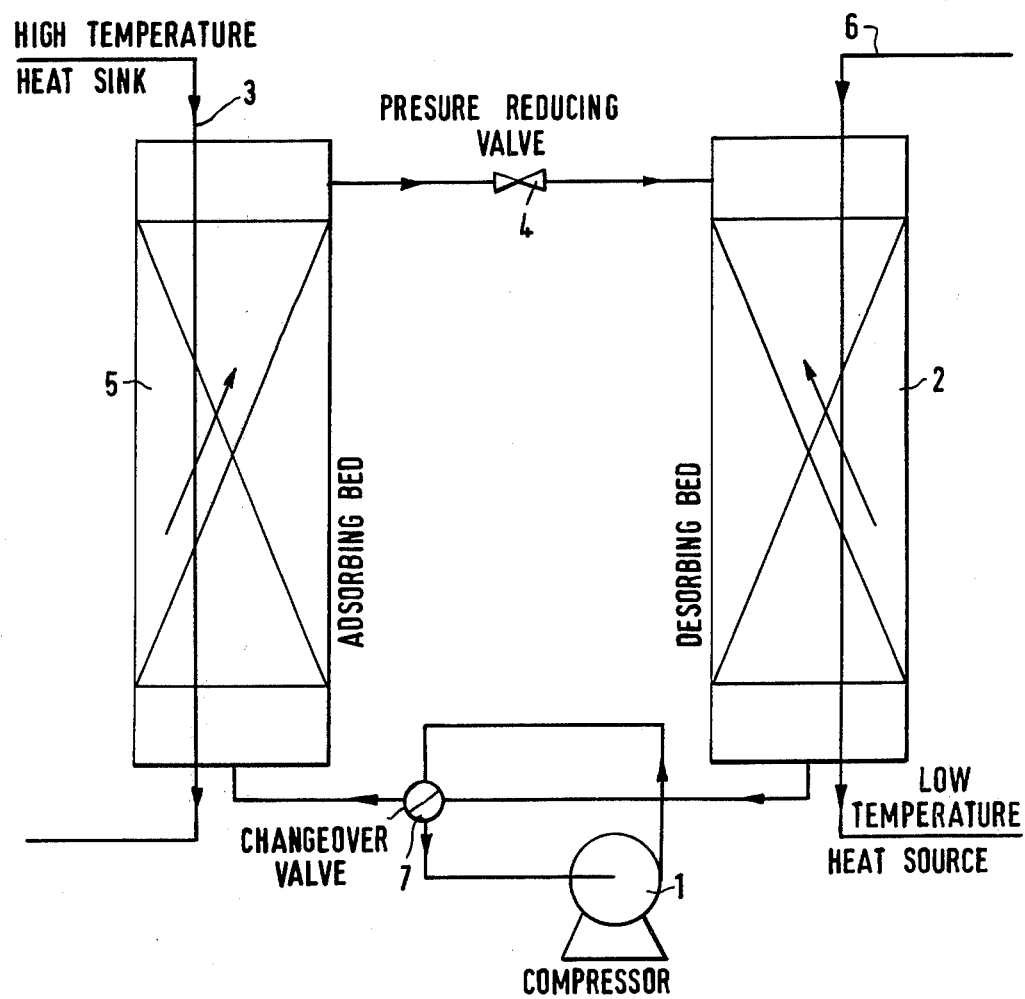

ADSORPTION HEAT PUMP

FIELD OF THE INVENTION

The present invention relates to an adsorption heat pump and, in particular, to a method of transferring heat from a low temperature reservoir to a high temperature reservoir.

DESCRIPTION OF THE PRIOR ART

U.S. Pat. No. 3,893,827 to Leppard issued on July 8, 1975 discloses a process for the selective removal of constituents from fluids using a pressure swing adsorption system in which two beds of an adsorbent material, such as silica gel, are used. A constituent is adsorbed from a fluid on passage of the fluid through a bed of adsorbent material and the effluent from the absorbing bed is passed through a bed of adsorbent material previously saturated with the constituent in order to effect regeneration of the bed. The adsorbing bed is operated at a higher pressure than the desorbing bed. This process provides a transient condition where the fluid stream emerging from the adsorbing bed is free of the constituent which has been adsorbed.

We have now surprisingly found that a pressure swing adsorption system can be utilized to operate a heat pump, the heat of adsorption of an adsorbable component being utilized to supply heat to a high temperature reservoir, and the heat of desorption of the adsorbable component being supplied from a low temperature reservoir.

SUMMARY OF THE INVENTION

In its broadest aspect, the present invention provides a method of transferring heat from a low temperature reservoir to a high temperature reservoir, which method comprises the steps of:

(i) desorbing an adsorbable component from a first bed of a reversible adsorbent for the adsorbable component which first bed has previously adsorbed the said adsorbable component, thereby causing an amount of heat equal to the heat of desorption of the adsorbable component to be adsorbed by the said first bed, the heat adsorbed being transferred to the said first bed from a low temperature reservoir in heat-exchange relationship with the said first bed;

(ii) adsorbing the adsorbable component on a second bed of a reversible adsorbent for the said adsorbable component, thereby liberating an amount of heat equal to the heat of adsorption of the adsorbable component, and transferring the heat liberated to a high temperature reservoir in heat-exchange relationship with the said second bed; and (iii) operating steps (i) and (ii) in a cyclical manner by reversing the mode of operation of the said first and the said second bed of reversible adsorbent before the adsorbing bed becomes saturated with the adsorbable component and before the desorbing bed becomes denuded of the adsorbable component.

DESCRIPTION OF THE DRAWINGS

FIG. 1b shows schematically the adsorption heat pump illustrated in FIG. 1a in its alternative operational mode.

DESCRIPTION OF THE PREFERRED EMBODIMENTS

Figure 1A:
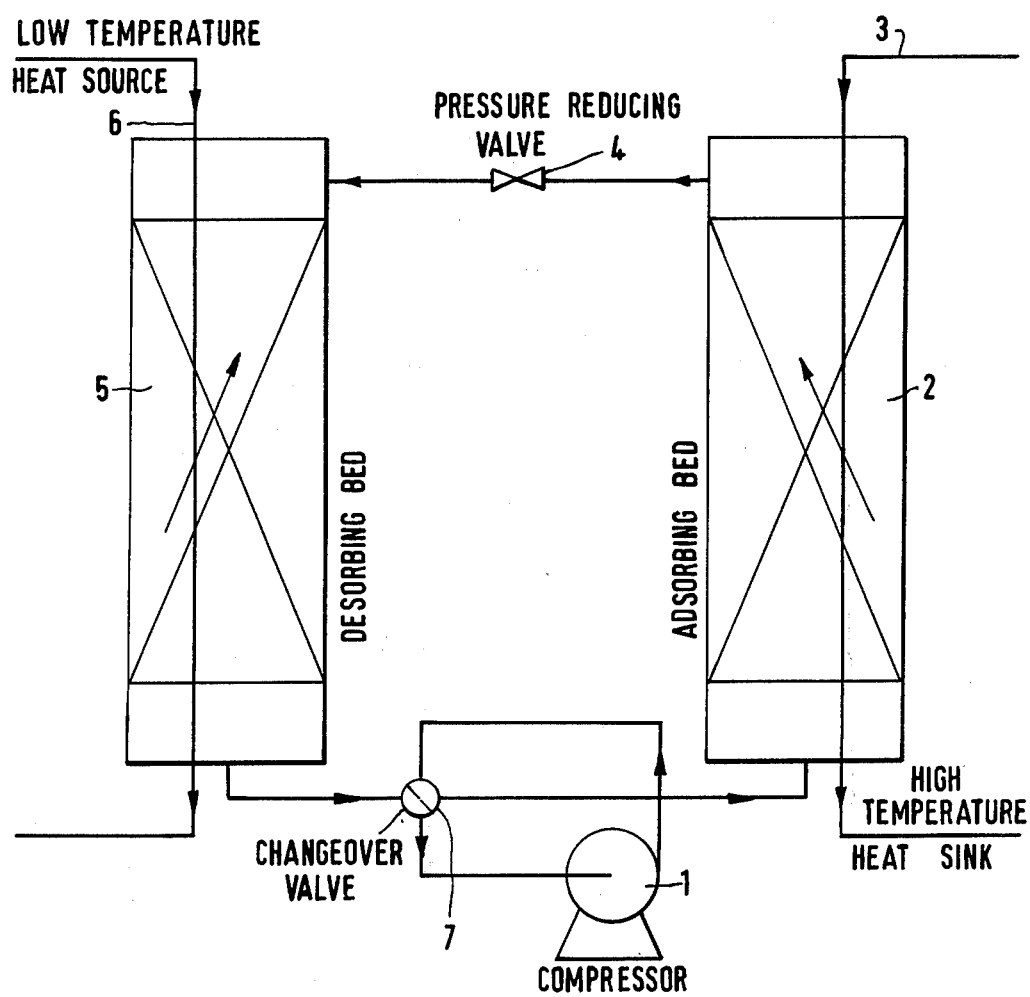
FIG. 1a shows schematically an adsorption heat pump of the invention in its first operational mode.

The adsorbable component is usually a constituent of a fluid mixture of adsorbable and substantially non-adsorbable components. The fluid mixture is preferably a gaseous mixture, with the adsorbable component being, for example, carbon dioxide, water vapour, steam, a fluorinated hydrocarbon, sulphur dioxide or ammonia, and the substantially non-adsorbable component being nitrogen, oxygen, argon or air. In carrying out the method of the invention using a gaseous mixture of this type, the adsorption of the adsorbable component is effected at a higher pressure than the desorption of the adsorbable component. This may conveniently be achieved by compressing the gaseous mixture before passage through the adsorbing bed and then subjecting the substantially non-adsorbable portion of the gas mixture leaving the adsorbing bed to a pressure reduction step prior to passage through the desorbing bed.

It will be understood, however, that it is possible to operate the process of the present invention using a single gaseous adsorbable component, providing that there is a pressure difference capable of inducing significant changes in adsorptive capacity. For example, a vacuum could be applied to the system to act as a driving force.

The low temperature reservoir may be any convenient source of low grade thermal energy such as ambient air, river water, lake water, the ground and as the sensible and latent heat associated with gaseous, liquid or solid industrial or domestic products, wastes and cooling media. In operating the method of the invention heat is extracted from the low temperature reservoir. It will be understood that the low temperature reservoir usually effects the heat transfer to the adsorbent bed via a heat exchanger or other conventional equipment. However, when the low temperature reservoir is not itself a fluid, for example the ground, then it is necessary to employ a heat exchange fluid to extract the energy from the low grade energy source and transmit it to the adsorbent bed. In this case, the heat exchange fluid may be water or a heat transfer fluid.

The high temperature reservoir may be any industrial or domestic fluid, or process medium.

Examples of materials which may be used as the adsorbent beds are particles of silica gel, natural zeolites and synthetic zeolites. It will be understood that the adsorbent materials used in the adsorbing and desorbing bed need not necessarily be the same, but in practice it is generally most convenient to use the same material. The first and second beds of material may be static beds or fluidised beds.

The first bed and second bed of adsorbent material are generally separate beds which are connected by the necessary associated pipework. However, in certain instances it may be convenient to form the first bed and second bed into an integrated bed with a suitable means for reduction of pressure between them, such as a pressure plate.

In operating the method of the invention, using a gaseous mixture of adsorbable and substantially non-adsorbable components, the cyclic flow of the gas through the system is maintained in one direction until the adsorbing bed is saturated or almost saturated with the adsorbable component. For a static bed system the direction of flow of gas through the system is then reversed, for example by means of a changeover valve.

When the beds of adsorbable material are fluidised the direction of gas through the system may be maintained the same and the fluidised bed material may be transferred from one bed to the other.

As mentioned above, heat exchangers are used to transfer the heat liberated by the adsorbing bed to the high temperature reservoir and to supply heat to the desorbing bed from the low temperature reservoir. Because each bed of material alternates between the adsorbing and desorbing mode, the arrangement of heat exchangers and associated pipework must permit transfer of heat from each of the beds to the high temperature reservoir and transfer of heat from the low temperature reservoir to each of the beds. This may be achieved in various ways, some of which are described below:

(a) Heat may be transferred to and from the adsorbable and non-adsorbable components outside the beds, and the flows of these components may be alternately diverted through the high temperature heat reservoir heat exchanger and the low temperature heat reservoir heat exchanger, as required.

(b) Heat may be transferred from within the adsorbing bed to the high temperature heat reservoir and from the low temperature heat reservoir to within the desorbing bed: either two heat exchangers may be installed in each bed or the high temperature reservoir fluid and the low temperature reservoir fluid may be alternately diverted through a single heat exchanger in each bed.

(c) The bed material may be fluidised and may be pumped from one bed vessel to the other. This allows one bed vessel and heat exchanger to be used always for adsorption and the other bed vessel and heat exchanger to be used always for desorption.

The temperatures at which the low temperature reservoir and high temperature reservoir operate will depend upon the particular system involved. For example, heat recovered for industrial use is generally required at a temperature in the range of from 100° to 150° C. For this type of application, the low temperature reservoir could have a temperature in the range of from 50° to 90° C. and it should then be possible to achieve the desired temperatures of from 100° to 150° C. for the high temperature reservoir. In order to operate space heating systems and hot water systems, a temperature of about 80° C. is required. For this type of application, the low temperature reservoir could have a temperature of about 0° C. and it should then be possible to achieve the desired temperature of about 80° C. for the high temperature reservoir.

The heat transferred to the high temperature reservoir during the adsorption of the adsorbable component is the heat of adsorption of this component on the particular adsorbent used, together with any sensible heat, such as that imparted to a gaseous mixture during compression before passage through the adsorbing bed. For carbon dioxide, the heat of adsorption on a synthetic zeolite is about 200 CHU/lb.

It is possible for certain operating systems for the adsorption of the adsorbable component onto the adsorbent to be accompanied by some chemical reaction which must, of course, be reversible. For example, if hydrogen is chosen as the adsorbable component then by suitable choice of the adsorbent bed material it would be possible to develop a system in which hydride formation occurred during the adsorption. At the lower pressure at which the desorbing bed is operated the hydrogen would be desorbed.

Referring to FIG. 1a, a gaseous mixture of an adsorbable component and substantially non-adsorbable component is compressed by a compressor 1 and passed into a bed 2 of an adsorbent material. During the passage of the gaseous mixture through the bed 2 the adsorbable component is adsorbed and the heat of adsorption, together with any sensible heat which the gas may have, is transferred to a high temperature heat sink 3 passing through a heat exchanger in the bed 2. The substantially non-adsorbable component leaves the bed 2, is passed through a pressure reducing valve 4 and then passed into a bed 5 of an adsorbent material which has previously adsorbed the adsorbable component. During the passage through the bed 5 the adsorbable component is desorbed from the bed, the latent heat of desorption being supplied to the bed from a low temperature heat source 6 passing through a heat exchanger in the bed 5. At the exit of bed 5 the gaseous mixture contains both the adsorbable and substantially non-adsorbable components. This mixture is passed to the compressor 1 where it is compressed and the cycle is repeated until the adsorbing bed 2 becomes saturated with the adsorbable component.

At this time, the system is switched to its alternative mode of operation. This is achieved by means of changeover valve 7 which is shown in FIG. 1a in one position and in FIG. 1b in its alternative position. The gaseous mixture is compressed by the compressor 1 and is then passed into bed 5 of the adsorbent material. In this mode of operation bed 5 acts as the adsorbing bed. A high temperature heat sink 3 passing through a heat exchanger in the bed is brought into operation. The adsorbable component is adsorbed onto the adsorbent material. The substantially non-adsorbable component leaves the bed 5, is passed through pressure reducing valve 4 and then passed into bed 2 of an adsorbent material. In this mode of operation bed 2 acts as the desorbing bed. A low temperature heat source 6 passing through a heat exchanger in the bed is brought into operation. The adsorbable component is desorbed and the cycle repeated.

It will be understood that the arrow shown in the schematic Figures indicate the direction of flow. It will furthermore be appreciated that each of the beds 2 and 5 is provided with two heat exchangers, one for the high temperature heat sink and one for the low temperature heat source. The heat exchanger corresponding to the particular mode of operation of the bed is then employed.

In order to further illustrate the manner in which heat is liberated on adsorption of an adsorbable component on a reversible adsorbent, the following trial experiments were carried out.

Experiment 1

Two initial trials were carried out on the adsorption of ammonia on silica gel with no heat extraction from the bed in order to determine the maximum temperature rise during adsorption and the maximum achievable temperature during adsorption for the conditions given below:

Adsorption pressure = 1 atm
Partial pressure of $NH_3$ = 1 atm
Inlet temperature of $NH_3$ = 45° C.
Inlet flow rate of $NH_3$ = 20 l/min
Bed diameter = 3 in.

Bed length = 18 in.
Weight of Silica Gel in bed = 3.3 lbs

The temperatures recorded during these trials showed a high temperature zone passing through the bed. The maximum temperature achieved in the first trial was 130° C. and in the second 100° C. The mean of these two results gives a maximum temperature of 115° C. which corresponds to a temperature rise of 70° C. on average.

Experiment 2

Two adsorption trials of ammonia on silica gel were carried out with heat extraction from the bed. The operating conditions and the results are given below:

Adsorption Pressure = 1 atm.abs.
Partial pressure $NH_3$ = 1 atm.abs. Inlet temperature of $NH_3$ = 22.5° C. 1st trial = 22.5° C. 2nd trial
Inlet flow rate of $NH_3$ = 35 l/min
Bed cross section = 4" × 2"
Bed length = 20"
Weight of silica gel in bed = 4.11 lbs
Water flow rate to heat exchanger in bed = 500 cc/min.
Water inlet temperature = 11.2° C.

The results obtained from the first trial show:
Heat extracted in 6 minutes = 23,500 cal = 93 Btu
Rate of heat extraction = 235,000 cal/hr = 932 Btu/hr
Max. Temp. diff. (Water inlet Gas outlet) = 37.8° C.
Max. $\Delta T$ of water = 10° C.
Amount of ammonia adsorbed = 122.5 l
Latent heat of ammonia = 590 Btu/lb = 1.003 Btu/l
Heat of adsorption of ammonia = 1.3 × 1.003 = 1.306 Btu/l
Heat evolved = 122.5 × 1.306 = 160 Btu
% of evolved heat extracted by water = 58%
Rate of heat extraction per lb silica gel = 227 Btu/lb hr.
Effective heating rate per lb Silica gel = 0.072 kW/lb silica gel The results obtained from the second trial show:
Heat extracted in 17 minutes = 54,037 cal = 214.4 Btu
Rate of heat extraction = 190,718 cal/hr = 756.8 Btu/hr
Max. temperature diff. (water inlet gas outlet) = 29.3° C.
Max. $\Delta T$. of water = 11.6° C.
Amount of ammonia adsorbed = 175.6 l
Heat of adsorption of ammonia = 1.306 Btu/l
Heat evolved = 175.6 × 1.306 = 229.3 Btu/l
% of evolved heat extracted by water = 93%
Rate of heat extracted per lb silica gel = 184 Btu/lb hr.
Effective heating rate per lb silica gel = 0.054 kW/lb silica gel.

The percentage of the available heat extracted by the cooling water in the first trial was 58% and in the second trial 93%. The difference in these results is significant and may be explained by the difference in gas outlet temperatures at the end of the trials. The lower gas outlet temperature at the end of the second trial indicates that a substantial amount of heat had been recovered by cooling in silica gel.

We claim:

1. A method for transferring heat from a low temperature reservoir to a high temperature reservoir which comprises the steps of:
    (a) bringing an outside low temperature reservoir and an outside high temperature reservoir into heat-exchange-relationship with an adsorption/desorption system comprising a fluid containing an adsorbable component, a first bed of a reversible adsorbent for the adsorbable component, and a second bed of a reversible adsorbent for the adsorbable component connected to each other by means for passing the fluid within the system from the first bed to the second bed, in such a manner that the low temperature reservoir is in heat-exchange-relationship with said first bed and the high temperature reservoir is in heat-exchange relationship with said second bed;
    (b) passing said fluid having a reduced content of the adsorbable component through the first bed and desorbing the adsorbable component from the first bed which first bed has previously adsorbed the adsorbable component from said fluid, thereby increasing the content of the adsorbable component in the fluid and causing an amount of heat equal to the consumed heat of desorption of the adsorbable component to be adsorbed by the said first bed, the heat adsorbed being transferred to the said first bed from the outside low temperature reservoir, in heat-exchange-relationship with the said first bed;
    (c) passing the fluid having an increased content of the adsorbable component through the second bed and adsorbing the adsorbable component on the second bed thereby reducing the content of adsorbable component in the fluid and liberating an amount of heat equal to the heat of adsorption of the adsorbable component, the liberated heat being transferred to the outside high temperature reservoir in heat-exchange-relationship with said second bed; and
    (d) operating steps (b) and (c) in a cyclical manner by reversing the mode of operation of the said first and said second bed and bringing the first bed in heat-exchange-relationship with an outside high temperature reservoir and the second bed in heat-exchange-relationship with an outside low temperature reservoir when or before the adsorbing bed becomes saturated with the adsorbable component and before the desorbing bed becomes denuded of the adsorbable component, whereby all of the adsorbable component is transferred from bed to bed in a closed loop.

2. Method according to claim 1 wherein the adsorbable component is a constituent of a fluid mixture of adsorbable and substantially non-adsorbable components.

3. Method according to claim 2 wherein the fluid mixture is a gaseous mixture.

4. Method according to claim 3 wherein the gaseous mixture is compressed before passage through the adsorbing bed and the substantially non-adsorbable portion of the gaseous mixture is subjected to a pressure reduction step prior to passage through the desorbing bed.

5. Method according to claim 2 wherein the adsorbable component is selected from the group consisting of carbon dioxide, water vapour, steam, a fluorinated hydrocarbon, sulphur dioxide and ammonia.

6. Method according to claim 1 which is operated using a single adsorbable gaseous component.

7. Method according to claim 1 wherein the high temperature reservoir is selected from an industrial fluid, a domestic fluid and a process medium.

8. Method according to claim 1 wherein the adsorbent beds are particles of a material selected from the group consisting of silica gel, a natural zeolite and a synthetic zeolite.

9. Method according to claim 1 wherein the first bed and the second bed form an integrated bed with a pressure reducing means between them.

10. Method according to claim 1 wherein the low temperature reservoir is selected from the group consisting of ambient air, river water, lake water, the ground, and sensible latent heat associated with gaseous liquid or solid industrial or domestic products, wastes and cooling media.

* * * * *